United States Patent [19]
Takai et al.

[11] Patent Number: 5,295,302
[45] Date of Patent: Mar. 22, 1994

[54] METHOD OF MANUFACTURING AN ALUMINUM HEAT EXCHANGER

[75] Inventors: Toru Takai; Toshio Koshizuka, both of Tochigi; Tutomu Sunaga; Makoto Negishi, both of Gunma, all of Japan

[73] Assignee: Calsonic Corporation, Tokyo, Japan

[21] Appl. No.: 49,656

[22] Filed: Apr. 21, 1993

Related U.S. Application Data

[63] Continuation-in-part of Ser. No. 968,510, Oct. 29, 1992, abandoned.

Foreign Application Priority Data

Oct. 29, 1991 [JP] Japan .................................. 3-283153
Sep. 4, 1992 [JP] Japan .................................. 4-237342

[51] Int. Cl.$^5$ .............................................. B23P 15/26
[52] U.S. Cl. ........................... 29/890.039; 29/890.043; 29/890.054; 228/183
[58] Field of Search ................... 29/890.039, 890.043, 29/890.054, 890.049, 890.045, 890.07; 228/183

[56] References Cited

U.S. PATENT DOCUMENTS

| | | |
|---|---|---|
| 4,688,311 | 8/1987 | Saperstein et al. . |
| 4,945,635 | 8/1990 | Nobusui et al. ................ 29/890.054 |
| 5,005,285 | 4/1991 | Ishu ................................ 29/890.054 |

FOREIGN PATENT DOCUMENTS

| | | |
|---|---|---|
| 62-207572 | 9/1987 | Japan . |
| 2-28980 | 2/1990 | Japan . |
| 3-35830 | 2/1991 | Japan . |

Primary Examiner—Irene Cuda
Attorney, Agent, or Firm—Sughrue, Mion, Zinn, Macpeak & Seas

[57] ABSTRACT

An aluminum heat exchanger is made from flat aluminum tubes formed with side edge projections having engaging surfaces and coated with brazing material on the outside surface but not on the inside surface of the tube or the projections. The opposite ends of the tubes are inserted into flat tube insertion holes in opposed header tanks which have a brazing material coated on the peripheral surface of the tank, so that, during brazing of the assembled heat exchanger components, brazing material flows from the header tanks to the engaging surfaces of the flat tubes.

7 Claims, 4 Drawing Sheets

METHOD OF MANUFACTURING AN ALUMINUM HEAT EXCHANGER

This is a continuation-in-Part of U.S. patent application Ser. No. 07/968,510 filed Oct. 29, 1992, now abandoned.

BACKGROUND OF THE INVENTION

This invention relates to methods for manufacturing heat exchangers such as radiators or condensers for motor vehicles and the like and, more particularly, to an improved process for brazing components of an aluminum heat exchanger.

There are conventional evaporators, condensers, radiators and the like, such as for motor vehicles, which consist of an aluminum heat exchanger manufactured by brazing. For such manufacture, the components of the heat exchanger are assembled together with brazing material, and the assembly is then heated in a furnace so that the components are brazed together. Each of the heat exchanger components includes an inner portion made of an aluminum alloy consisting of pure aluminum and a metal such as manganese and a coating portion containing brazing material cladded on the surface of the inner portion. The brazing material in the coating portion is an aluminum alloy which contains an element such as silicon and which has a lower melting point than the aluminum-manganese alloy. The brazing material is coated on that part of the inner portion which is to be brazed. The components consisting of the inner aluminum alloy portions and the outer coating portions are then assembled. Alternatively, the components of the heat exchanger may consist of the inner portions and layers of the brazing material which are simply placed on the parts of the inner portion which are to be brazed. After the components have been assembled, a flux is applied to those parts of the inner portions of the members to be brazed, and the components are then brazed in a furnace so that they are joined together. If the components are to be brazed to each other in a vacuum furnace, a flux need not be applied to them.

FIG. 5 of the drawings shows a conventional parallel flow aluminum heat exchanger 100 of the type disclosed in Japanese Utility Model Application Laid-open No. 28,980/90 and Japanese patent application Laid-open No. 207,57287. In this case, the heat exchanger 100 include a core 104, a pair of spaced header tanks 101 made of aluminum, and some reinforcing plates 105. The core 104 includes a plurality of flat tubes 102 extending between the header tanks 101 so as to carry a fluid which is subjected to heat exchange by the heat exchanger, and a series of corrugated fins 103 mounted between the tubes to act as heat transfer members. The core 104 is disposed between the header tanks 101 so that the flat tubes 102 communicate with the tanks at both ends. The flat tubes 102, the corrugated fins 103, the header tanks 101, and the reinforcing plates 105 are brazed together in a furnace so as to form the heat exchanger 100.

Each of the header tanks 101 is formed from a pipe which has a circular cross-section, originally open at both ends, and has an inner portion 101a made of an aluminum alloy and a brazing material 101b coated on the peripheral surface of the inner portion so that the combination constitutes the pipe as shown in FIG. 6. At each end, the header tank 101 also includes a lid 106 made of an aluminum alloy and provided with a brazing material on the outside surface to braze it to the pipe so as to close the pipe at both ends. The pipe also has a series of flat tube insertion holes 107 into which the ends of the flat tubes 102 are inserted. The corrugated fins 103, which are made of an aluminum alloy and are not coated with brazing material, are inserted between the flat tubes 102. The pipes of the header tanks 101 have inlet and outlet tube-receiving holes in which inlet and outlet pipes 108 and 109 made of an aluminum alloy are inserted The reinforcing plates 105 are cladded with a brazing material on the sides which face the core 104.

As shown in FIG. 7, which is a cross-sectional view of a tube 102, each of the flat tubes 102 includes an inner portion 102a made of an aluminum alloy and a brazing material 102b cladded on the outer surface of the inner portion. An inner fin 110 is inserted into each of the flat tubes 102 so that the internal space R thereof is divided into a plurality of fluid passages r. The inner fin 110 functions to improve the transfer of heat from the fluid to the tube 102 and to enhance the strength of the tube against lateral pressure. The inner fin 110 includes a thin inner portion 110 made of an aluminum alloy and a brazing material 110b coated on both sides of the inner portion.

It is well known that, when a flat tube such as the flat tube 102 is manufactured, a band of sheet material is bent by forming rollers so as to butt both of the side edges of the sheet against each other, the side edges are then seam-welded to each other, and the bent and welded sheet is thereafter cut off to a prescribed length. This manufacturing process is illustrated in FIG. 8. As shown therein, the band of sheet material, which is flat and long, is bent at the centerline of the sheet to a U shape by forming rollers so that the sheet is gradually formed into a flat tube to butt the side edges 102c and 102d of the sheet against each other. Electric current is thereafter applied in an argon gas atmosphere to the abutting side edges 102c and 102d through a roller electrode 115 which engages the edges and is connected to a rotary welding transformer 114, and the sheet formed as the flat tube is pressed on both sides and at the bottom, so that the edges are welded to each other. This produces the flat tube 102.

When the heat exchanger 100 is manufactured, the surfaces of the inner fins 110 are coated with a noncorrosive flux and the fins are inserted into the tubes 102. The corrugated sheets 103 are inserted between the flat tubes to form the core 104 of the exchanger, and the ends of the tubes are inserted into the flat tube insertion holes 107 of the header tanks 101. In addition, the reinforcing plates 105 are mounted on the top and bottom of the body. All of these components are held together with jigs, a noncorrosive flux is applied to the brazed parts of the components in the usual manner, and the components are then brazed to each other in a furnace so that the flat tubes are joined to the inner fins and the corrugated fins and to the header tanks at the flat tube insertion holes thereof. Since the flat tubes 102 and the corrugated fins 103 are stacked alternately and the assembly is compressed so as to produce the spacing between the tubes, there is a relatively large variation in that spacing. Consequently, if the clearance between the ends of the flat tubes 102 and the header tank 101 at the flat tube insertion holes 107 thereof is not large enough, it is likely that one or more of the tubes cannot be inserted into its insertion hole. To overcome this problem, the clearance between the tube ends and the holes is increased However, if this clearance is increased too much, there will be insufficient brazing material 102b on the flat tube 102 to braze the tube securely to the header tank 101 at the tube insertion hole 107. As a result, the clearance will not be filled completely with brazing material, leaving a hole which will permit fluid to leak out of the heat exchanger. To deal with this problem, brazing material is provided on the header tanks 101 at the flat tube insertion holes 107 thereof by cladding of the tanks with the material or by placing it on the tanks prior to brazing.

Since butt-seam welding is performed in the above-described method of manufacturing the flat tube 102, the manufacturing efficiency is not good and expensive welding equipment is required.

To overcome this problem, a flat tube 116, shown in FIG. 9, is brazed to a header tank with which the tube is in surface contact. The flat tube 116 is of the type disclosed in Japanese published Application No. 35,830/91 and has side edge projections 116d extending from one side of the tube, as shown in FIG. 9. To manufacture the flat tube 116, a band of sheet material including an inner portion 116a and a brazing material 116b coated or cladded on the outer surface of the inner portion is folded and formed. The brazing material 116b is used to braze the tube 116 to corrugated fins 103 on opposite sides of the tube, as shown in FIG. 10, and to the header tanks and to fill the clearance between the tube ends and the tanks at the flat tube insertion holes therein. The tube 116 also includes another coating of brazing material 116c on the inner surface of the inner portion 116 to braze the engaging surfaces 116e of the side edge projections 116d to each other and to braze the tube to inner fins 117 which are inserted in the tube as shown in FIG. 10. Initially, the height $h_2$ of the space within the flat tube 116 for the inner fin 117 is slightly greater than the height $h_1$ of the inner sheet, and there is a gap S between the side edge projections 116d, as shown in FIG. 9. After a noncorrosive flux is applied to the inner fin 117, the fin is inserted into the flat tube 116 and the tube is then deformed slightly by pressing, so that the tube has a predetermined height H, as shown in FIG. 10.

Thereafter, all of the heat exchanger components including the flat tubes 116 are held together with jigs, a noncorrosive flux is applied to the coated parts of the components, and they are then heated in a furnace in the manner described above. As a result, the engaging surfaces 116e of the side edge projections 116d of the flat tubes 116 are brazed to each other, the tubes are brazed to the corrugated fins 103 and to the header tanks, and the inner fins 117 are brazed to the inner surfaces of the tubes.

However, it has been found that a minute hole is generated in the flat tube 116 near the end received in the header tank opening at the time of heating. It is believed that the minute hole is produced because the temperature of the flat tube 116 and the corrugated fin 103 rises more quickly than that of the header tank during heating in the furnace because the fin materials used for the tube and for the corrugated fin are thinner than the header tank material in order to enhance the heat-exchanging property of those components.

This phenomenon is described as follows. Since the temperature of the flat tube 116 and the corrugated fin 103 rises more quickly than that of the header tank, the brazing materials 116b and 116c of the tube melt sooner than the brazing material on the tank. When the brazing material on the tank does melt, there is a clearance between the tube 116 and the tank at the flat tube insertion hole. Consequently, the molten brazing material from the tank flows into that clearance and comes into contact with the ends of the engaging surfaces 116e of the side edge projections 116d of the tube so that much of the molten material flows between the engaging surfaces due to capillary attraction. As a result, the silicon from not only the brazing material 116c of the flat tube 116 but also from that of the brazing material of the header tank diffuses into the inner portion 116a of the tube at the engaging surfaces 116e so that the aluminum alloy of the inner portion at the engaging surfaces changes into an aluminum-silicon alloy having an excessive silicon content which is lower in melting point than the aluminum alloy. For that reason, the inner portion 116a is eroded by both the brazing materials so that a minute hole is generated in the flat tube 116. It is difficult to find the minute hole by the naked eye, and the hole usually cannot be found until the inspection after completion of the heat exchanger. This reduces the production yield of heat exchangers in the manufacturing process.

SUMMARY OF THE INVENTION

Accordingly, it is an object of the present invention to provide a method for manufacturing an aluminum heat exchanger which overcomes the disadvantages of the prior art.

Another object of the invention is to provide a method for manufacturing a low-cost aluminum heat exchanger having secure brazing in a simple and inexpensive way.

These and other objects of the invention are attained by providing header tanks having a brazing material coating the outer surface of the inner portion of the tanks and having a series of flat tube insertion holes, inserting flat tubes having side edge projections and having no brazing material on the interior surfaces of the tubes into the flat tube insertion holes of the header tanks so that the core of a heat exchanger is provided by the flat tubes, and heating the heat exchanger core to effect brazing. During the heating, the molten brazing material from the header tank enters the engaging surfaces of the side edge projections of each flat tube by capillary attraction, not only in the transverse direction of each projection but also in the longitudinal direction thereof. The molten brazing material is thus supplied in an appropriate quantity to the engaging surfaces of the side edge projections to braze them together so that the joint between the projections has a high enough strength but is not eroded by silicon in the brazing material. Moreover, this brazing procedure is very easy to carry out and therefore results in reducing the manufacturing cost of the exchanger.

More particularly, a plurality of thin flat tubes for conveying a fluid which is to be subjected to heat exchange by the heat exchanger and a plurality of heat transfer fins made of aluminum are alternately disposed in adjacent relation to each other to form the core of the exchanger. The core is disposed between two header tanks, made of aluminum which is thicker than that of the flat tubes and the heat transfer fins which are spaced in facing relation by a predetermined distance, and the core is assembled with the tanks so that the tubes communicate with the tanks. The assembly of the core and the tanks is subjected to integration brazing in a furnace so that the tubes, the fins and the tanks are joined together. According to the invention, each of the flat tubes is made from a band of fin material having a brazing material on one side but no brazing material on the other side which is bent about the axis of a passage for the fluid so that the tube is open at both ends and has the brazed side as the outer surface of the tube and of two side edge projections with engaging surfaces at one or both sides of the tube. The heat exchanger core is assembled from the tubes, the header tanks are mounted on the core and the assembly is put in a furnace and subjected to the integration brazing therein so that the engaging surfaces of the tube side edge projections are brazed to each other by part of the brazing material from the tanks to which the tubes are joined at both ends.

In the method according to the present invention, the flat tubes having no brazing material on the inner surfaces of the tubes are inserted into the flat tube insertion holes of the header tanks which are coated with brazing material so that the tubes and the tanks are assembled. The assembly is heated at a prescribed temperature in the furnace so that the brazing material is melted and spreads to the entire engaging surfaces of the side edge projections of the flat tubes by capillary attraction so as to braze those surfaces to each other without causing an excessive quantity of silicon to permeate into the tubes at the projections to erode the tubes to generate a minute hole in each of them.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
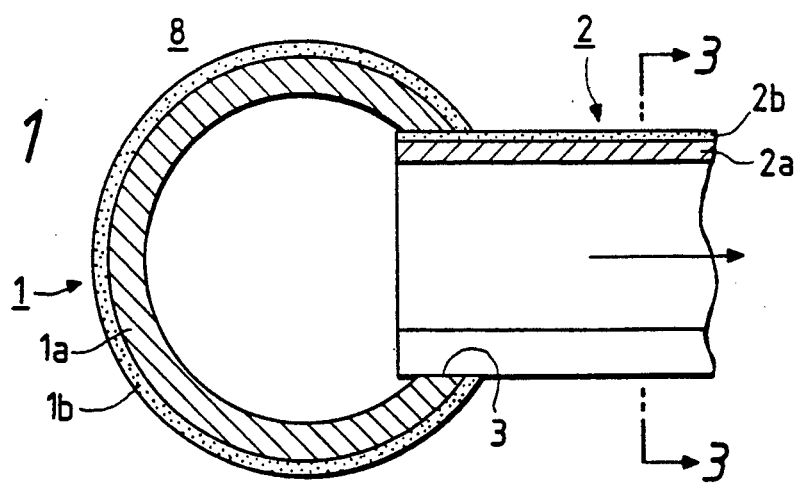
FIG. 1 is a fragmentary sectional view of a representative embodiment of a heat exchanger arranged according to the invention illustrating the positional relationship between a flat tube and a header tank.
Figure 3:
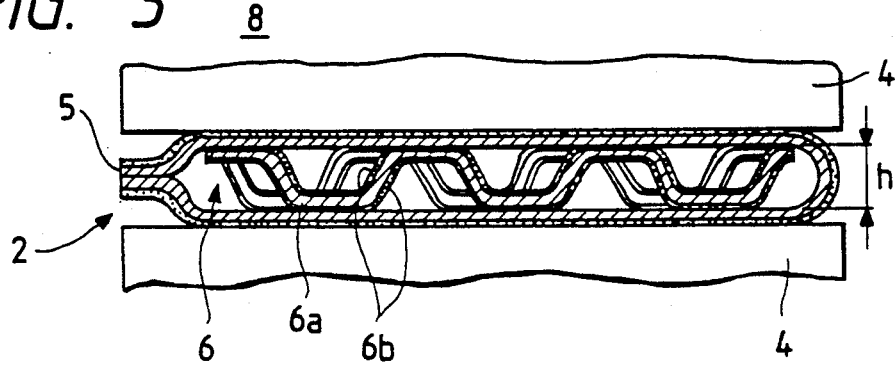
FIG. 3 is a cross-sectional view of a portion of the embodiment shown in FIG. 1, taken along line 3—3 thereof.
Figure 2A:
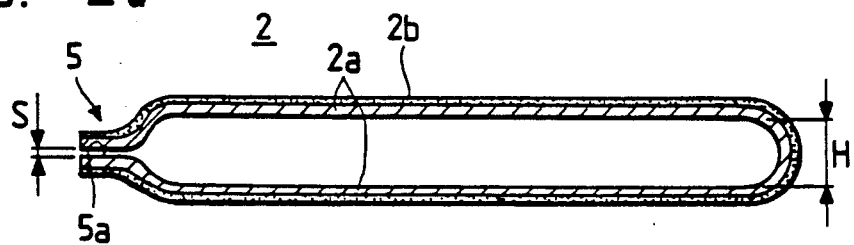
FIG. 2A is a cross-sectional view of a flat tube for use in the embodiment shown in FIG. 1.
Figure 2B:
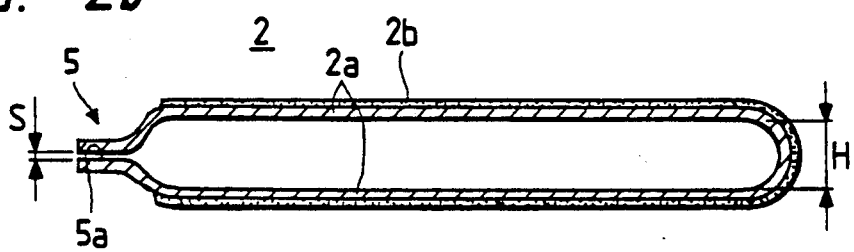
FIG. 2B is a cross-sectional view of a modified flat tube for use in the embodiment shown in FIG. 1.
Figure 2C:
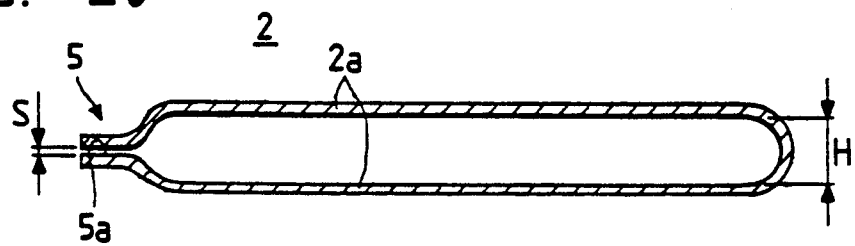
FIG. 2C is a cross-sectional view of another modified flat tube for use in the embodiment shown in FIG. 1.

A representative embodiment of the invention is shown in FIGS. 1-3 of the drawings. In those drawings, FIG. 1, which is a fragmentary sectional view of a heat exchanger such as a parallel flow-type condenser for a motor vehicle, illustrates the positional relationship between a header tank 1 and a flat tube 2 of the heat exchanger, FIGS. 2A-2C are sectional views of the flat tube 2 before an inner fin 6 is inserted into it (in FIG. 1, the inner fin 6 is r° moved for explanation.), and FIG. 3 is a sectional view of the heat exchanger shown in FIG. 1, taken along the line 3-3 thereof.

Referring first to FIG. 1, a header tank 1 for a typical heat exchanger is a pipe having a circular cross-section provided with a series of flat tube insertion holes 3. The heat exchanger includes two such header tanks 1 in spaced relation with insertion holes 3 located in the mutually facing portions of the tanks into which the opposite ends of the flat tubes 2 of the exchanger are inserted. The tanks 1 also have lids, not shown in FIG. 1, which close both ends of the pipes. Each of the tanks 1 is made of a plate about 1.5 mm thick and includes an inner portion la made of an aluminum alloy such as JIS 3003, and a brazing material 1b such as JIS 4343 coat or clad on the outer surface of the inner portion with a thickness of about 8% of the thickness of the aluminum plate from which the tank is formed.

Each of the flat tubes 2 is made from a band of sheet material about 0.32 mm thick and includes an inner portion 2a which is an aluminum alloy such as JIS 3003 and a brazing material 2b such as JIS 4343 coated or cladded on the outer surface of the inner portion with a thickness which is about 8% of that of the sheet. The brazing material 2b is for brazing the flat tube 2 to adjacent corrugated fins 4 which are disposed between the flat tubes of the exchanger and to the header tanks 1 at the flat tube insertion holes 3 thereof.

A flat tube 2 having side edge projections 5 along one side of the tube, as shown in FIG. 2A is formed from a band of sheet material by rollers. The height H of the inner wall spacing of the flat tube 2 is larger than the height h of an internal corrugated sheet 6 disposed within the tube as shown in FIG. 3 and there is a gap S between the inner surfaces of the side edge projections 5. The flat tube 2 is cut to a prescribed length depending on the distance between the header tanks 1.

The inner fin 6 is a corrugated band of sheet material about 0.32 mm thick and includes an inner portion 6a which is made of an aluminum alloy such as JIS 3003 and a brazing material 6b such as JIS 4343 coated on both sides of the inner portion with a thickness about 13% of that of the sheet. The corrugations of the inner fin 6 are alternately displaced periodically along the length of the fin perpendicularly to the longitudinal direction thereof so that a fluid which is passing through the flat tube 2 is forced by the corrugations to follow a zigzag path through the flat tube, thus improving the heat-exchange efficiency of the exchanger. The reason why there is more brazing material on the inner fin 6 than on the flat tube 2 is to prevent the corrugated fin from being insufficiently bonded to the inner surface of the tube, which would reduce the strength of the fin against pressure.

The corrugated fins 4 disposed between the flat tubes are about 0.32 mm in thickness, have no brazing material, and are formed from an aluminum alloy such as JIS 3003.

Figure 5:
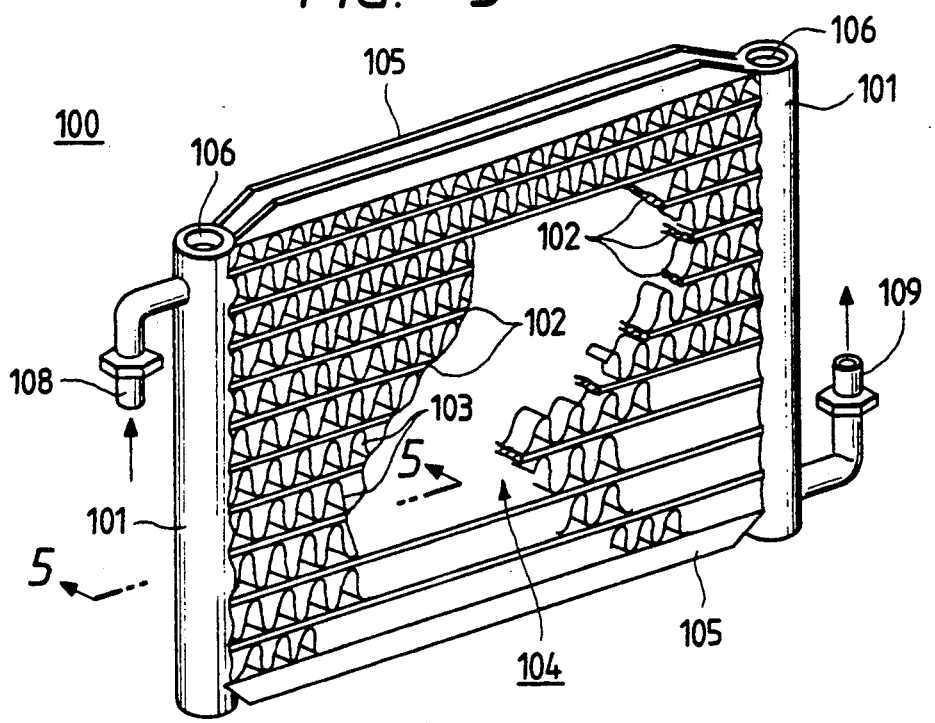
FIG. 5 is a perspective general view, partially broken away, showing a heat exchanger of the parallel flow type.
Figure 6:
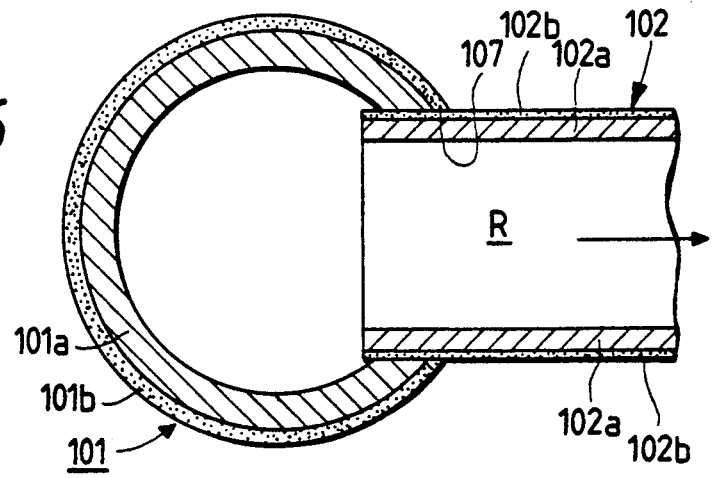
FIG. 6 is a sectional view of the heat exchanger shown in FIG. 5 taken line 5-5 thereof.
Figure 7:
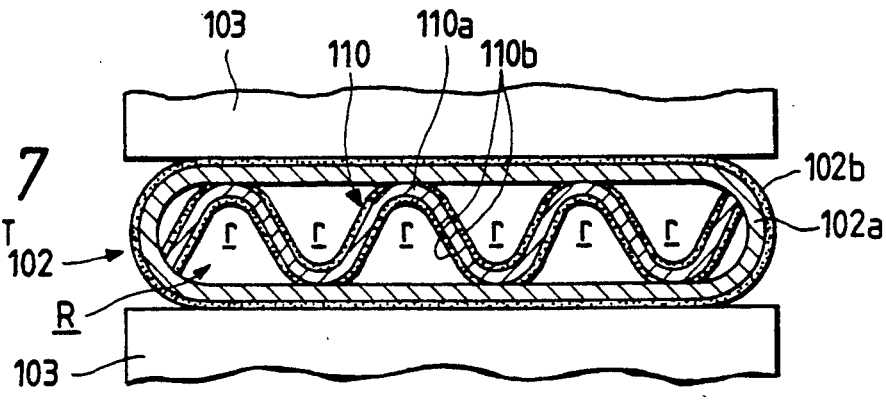
FIG. 7 is a cross-sectional view of a conventional flat tube for use in a heat exchanger.
Figure 8:
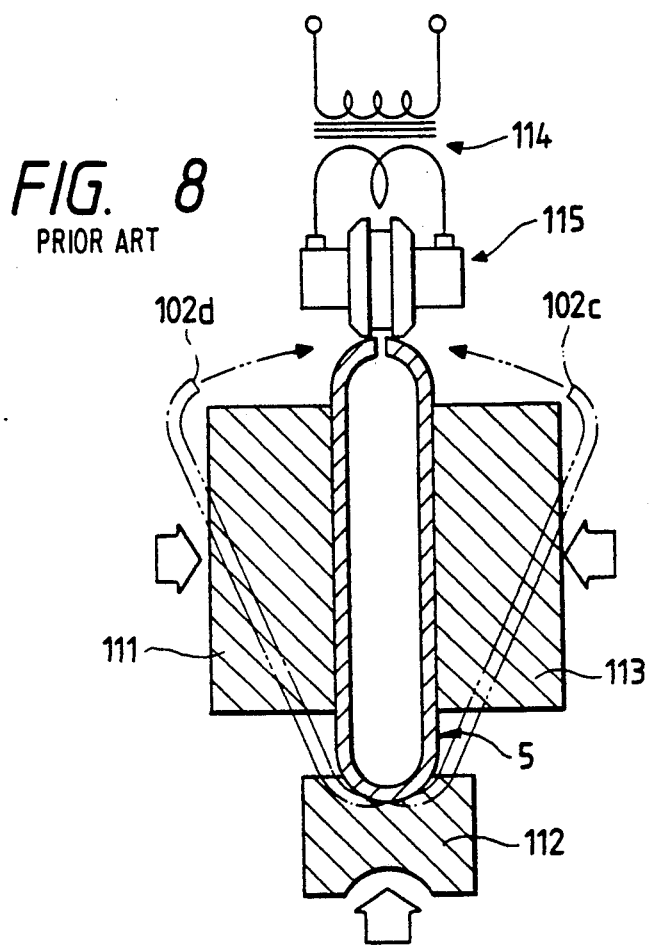
FIG. 8 is a sectional view illustrating the manufacture of a conventional flat tube.
Figure 9:
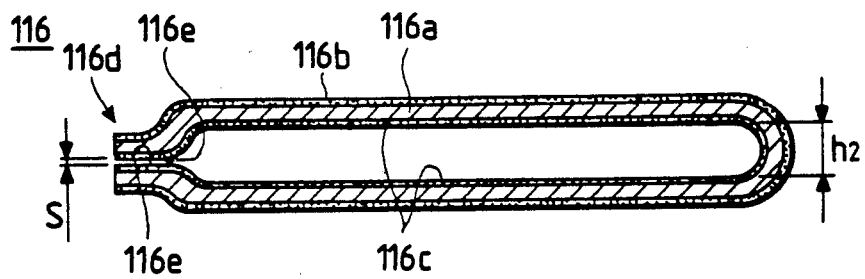
FIG. 9 is a sectional view showing another form of conventional flat tube prior to the addition of internal components.
Figure 10:
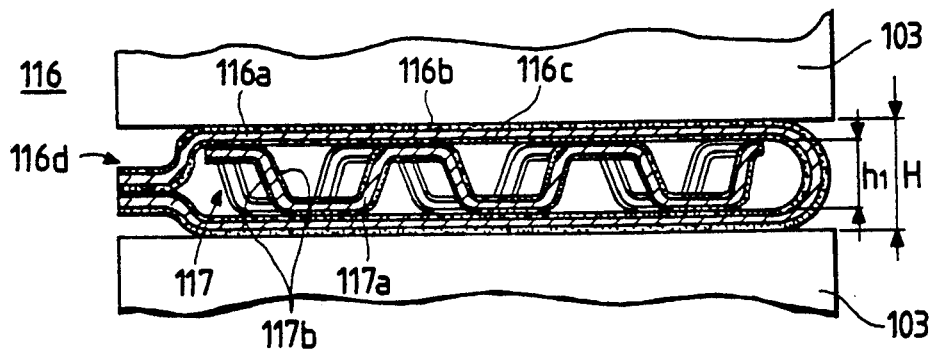
FIG. 10 is a sectional view of the conventional flat tube shown in FIG. 9 after completion thereof.

The method of manufacturing the heat exchanger is as follows. A noncorrosive flux is applied to the inner fin 6. The fin 6 is inserted into the flat tube 2. The tube 1 is then deformed to a prescribed height by pressing so that the tube becomes the flat tube 2. Flat tubes 2 and corrugated fins 4 are assembled alternately to form the code 8 of the heat exchanger which is then fastened to the header tanks 1. Reinforcing plates made of aluminum alloy such as JIs 3003, as shown in FIG. 5, are mounted on the outer surfaces of the outermost corrugated fins 4 of the core 8 so that a brazing material such as JIS 4343, which is coated on the side of the plates facing the heat exchanger core, is in contact with those outer surfaces.

These components of the heat exchanger are then held together with brazing jigs and a noncorrosive flux is applied to the coated parts of the components in a conventional manner. The components are put in a furnace with the header tanks 1 extending horizontally and the flat tubes 2 extending vertically and heated so that the members are brazed together When the members are in the furnace, the side edge projection 5 of each flat tube 2 may be located either at the top of the tube or at the bottom thereof. The brazed parts of the members include the engaging surfaces 5a of the side edge projections 5 of the flat tubes 2, the engaging surfaces of the flat tubes and the inner fins 6, and so forth. The heat exchanger is thus manufactured of aluminum.

The reason why the brazing material spreads effectively to the inner surfaces of the side edge projections 5 of the flat tube 2 even though brazing material is not provided on the inner surface of the tube is believed to be as follows. Since the flat tube 2 and the inner fin 6 are thinner than the tanks 1, the temperature of each of them rises more quickly than that of the header tank 1 during heating of the exchanger components in the furnace, so that the brazing material 2b of the flat tube melts sooner than the brazing material 1b of the header tank. When the brazing material 1b of the header tank 1 is molten, capillary attraction causes the material to enter into the clearance between the flat tube 2 and the tank at the flat tube insertion hole 3 thereof and spreads to the engaging inner surfaces 5a of the side edge projections 5 of the tube. Since the band of sheet material used to make the flat tube 2 is initially rolled by a roller so as to have a rough surface and the tube is then formed by rolling, there is a minute gap between the engaging inner surfaces 5a so that the molten brazing material 1b is allowed to spread to the entire engaging surfaces by capillary attraction. Since the brazing material 1b of the header tank 1 and that 2b of the flat tube 2 are put in contact with each other, the molten brazing material 2b is likely to spread to the engaging inner surfaces 5a through the minute gap. The brazing material 2b does not have to be applied to the outer surfaces of the side edge projection 5, as shown in FIG. 2B. That is, the brazing material 2b may be applied to a substantial outer surface of the flat tube 2 excluding the outer surfaces of the flat tube 2 at the side edge projection 5. Further, as shown in FIG. 2C, the brazing material 2b can be omitted entirely, i.e., no brazing material need be applied to the outer surface of the flat tube 2. In this case, brazing material may be applied to the surfaces of the fins 4 to contact the fins 4 to the outer surface of the flat tube 2.

Figure 4:
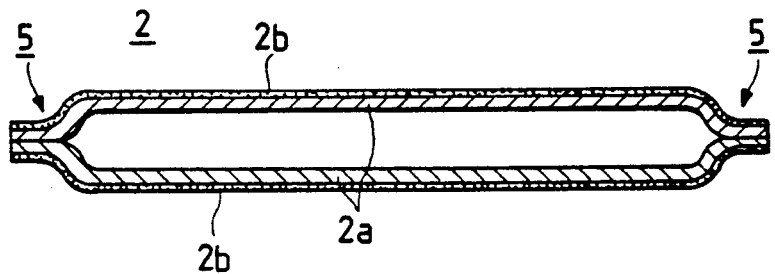
FIG. 4 is a cross-sectional view of a modified form of a flat tube for use in accordance with the invention.

The present inventors manufactured such a heat exchanger without providing the inner fin 6 therein and conducted an experiment to examine how the molten brazing materials of the header tank 1 and the flat tube 2 flowed. The flat tube 2 was 700 mm in length, 17 mm in width, and each side edge projection 5 was about 1 mm in width. The header tank 1 was about 22 mm in outside diameter. The inventor also used another kind of flat tube 2 to conduct the same experiment. The latter flat tube 2 has side edge projections 5 at both sides of the tube as shown in FIG. 4 and was 700 mm in length, 17 mm in width, and the width of each side edge projection was about 1 mm. It was confirmed through this experiment that the molten brazing material of both kinds of flat tubes 2 spread well to the engaging inner surfaces 5a of the side edge projections 5. Since the inner fin 6 is located at a relatively large distance from the side edge projections 5 of the flat tube 2 in the heat exchanger manufactured by the method, the result of the experiment obviously shows that the molten brazing material of the inner fin does not spread to the engaging inner surfaces 5a of the projections.

Since no brazing material is initially provided on the engaging inner surfaces 5a of the projections 5 of the flat tube 2, the spreading of the brazing material 1b of the header tank 1 to those surfaces does not provide a quantity of silicon on those surfaces which is large enough that the silicon diffuses excessively into the projections to make an aluminum-silicon alloy of lower melting point so as to erode the projections and generate a minute hole therein. For that reason, the flat tube 2 of the heat exchanger manufactured in the method is strong enough for use and has a high reliability against leaking of the fluid flowing in the tube.

Although the invention has been described herein with reference to a specific embodiment, many modifications and variations therein will readily occur to those skilled in the art without departing from the spirit or essential character of the invention. For example, a brazing material may be coated n the inner surface of the header tank 1 and the brazing material 1b thereof may not be coated on the peripheral surface of the inner portion 1a of the tank, but may be simply mounted on the peripheral surface. Also, the invention may be used for manufacturing a heat exchanger as a condenser, a radiator for a motor vehicle, the heater core of an air-conditioner for a motor vehicle, or the like, in which a tank and plates are assembled, and a brazing material is provided to coat the plates at the flat tube insertion holes thereof or be simply mounted on the plates at the holes to braze the flat tubes to the plates at the holes. Accordingly, all such variations and modifications are included within the intended scope of the invention. Of course, the present invention may be applied to a conventional vacuum brazing method.

We claim:

1. A method for manufacturing an aluminum heat exchanger comprising the steps of:
   providing a thin aluminum sheet material;
   coating a brazing material on one surface of the sheet material but not on an opposite surface;
   forming a plurality of flat tubes from the thin aluminum sheet material so that each of the tubes has adjacent engaging side projections, is open at both ends, and has the brazing material on an outer surface but not on an inner surface thereof;
   assembling the plurality of flat tubes and a plurality of aluminum heat transfer fins in alternate engaging relation to each other to form the core of a heat exchanger;
   providing at least two spaced aluminum header tanks made of thicker material than the flat tubes and heat transfer fins and disposed in facing relation at a selected distance from each other;

assembling the header tanks with the core of the heat exchanger so that the ends of the flat tubes are received in the tanks;

providing the header tanks with brazing material to braze the ends of the flat tubes to the tanks; and integration brazing the assembly of the heat exchanger core and the tanks in a furnace so that the flat tubes, heat-transfer fins and header tanks are joined together and so that the engaging surfaces of the side projections of the flat tubes are brazed to each other, without any previous welding of the side projections, by brazing material from the header tanks to which the ends of the tubes are joined during brazing.

2. The method of claim 1, wherein said brazing material comprises a clad material cladded on said one surface of the sheet.

3. The method of claim 1, wherein the flat tubes are formed using two thin sheets of aluminum, and wherein the engaging side projections extend along opposite edges of the flat tubes.

4. A method for manufacturing an aluminum heat exchanger comprising the steps of:

providing a thin aluminum sheet material;

coating a brazing material on substantially all of one surface of the sheet material but not on an opposite surface;

forming a plurality of flat tubes from the thin aluminum sheet material so that each of the tubes has adjacent engaging side projections, is open at both ends, and has the brazing material on substantially an entire outer surface thereof except at the adjacent engaging side projections;

assembling the plurality of flat tubes and a plurality of aluminum heat transfer fins in alternate engaging relation to each other to form the core of a heat exchanger;

providing at least two spaced aluminum header tanks made of thicker material than the flat tubes and heat transfer fins and disposed in facing relation at a selected distance from each other;

assembling the header tanks with the core of the heat exchanger so that the ends of the flat tubes are received in the tanks;

providing the header tanks with brazing material to braze the ends of the flat tubes to the tanks; and integration brazing the assembly of the heat exchanger core and the tanks in a furnace so that the flat tubes, heat-transfer fins and header tanks are joined together and so that the engaging surfaces of the side projections of the flat tubes are brazed to each other, without any previous welding of the side projections, by brazing material from the header tanks to which the ends of the tubes are joined during brazing.

5. A method for manufacturing an aluminum heat exchanger comprising the steps of:

providing a thin aluminum sheet material;

forming a plurality of flat tubes from the thin aluminum sheet material so that each of the tubes has adjacent engaging side projections and is open at both ends;

providing a plurality of aluminum heat transfer fins;

applying a brazing material to the plurality of aluminum heat transfer fins;

assembling the plurality of flat tubes and the plurality of aluminum heat transfer fins in alternate engaging relation to each other to form the core of a heat exchanger;

providing at least two spaced aluminum header tanks made of thicker material than the flat tubes and heat transfer fins and disposed in facing elation at a selected distance from each other;

assembling the header tanks with the core of the heat exchanger so that the ends of the flat tubes are received in the tanks;

providing the header tanks with the brazing material to braze the ends of the flat tubes to the tanks; and integration brazing the assembly of the heat exchanger core and the tanks in a furnace so that the flat tubes, heat-transfer fins and header tanks are joined together and so that the engaging surfaces of the side projections of the flat tubes are brazed to each other, without any previous welding of the side projections, by brazing material from the header tanks to which the ends of the tubes are joined during brazing and such that no brazing material is required to be applied to inner and outer surfaces of the flat tubes to bond the engaging surfaces of the side projections.

6. The method of claim 4, wherein the flat tubes are formed using two thin sheets of aluminum, and wherein the engaging side projections extend along opposite edges of the flat tubes.

7. The method of claim 5, wherein the flat tubes are formed using two thin sheets of aluminum, and wherein the engaging side projections extend along opposite edges of the flat tubes.

* * * * *